Oct. 18, 1955   J. C. JOHNSTON   2,721,159
METHOD OF MAKING A MOLDED PIPE JOINT
Filed Dec. 4, 1952
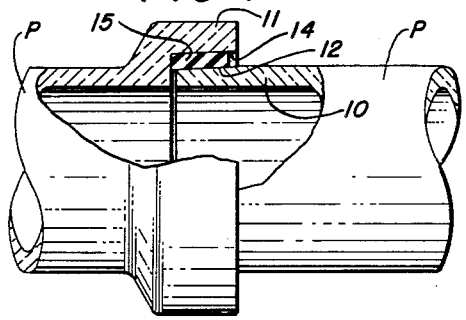
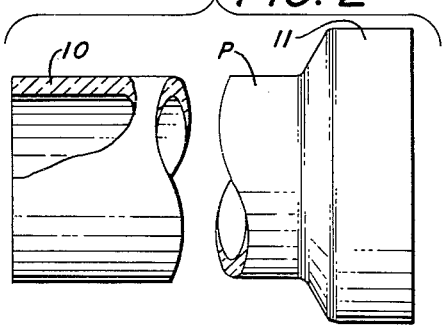
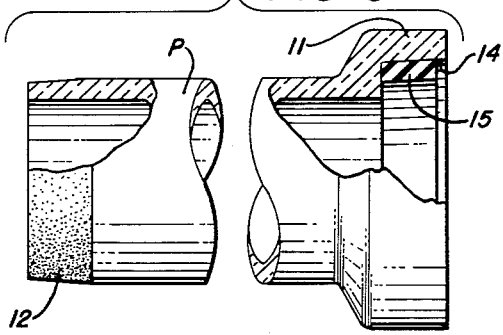
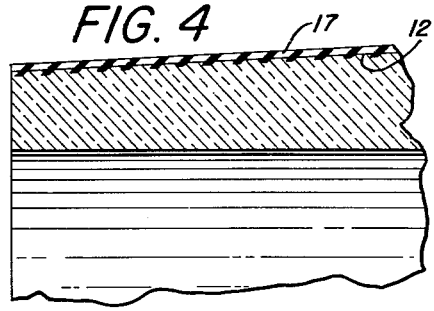
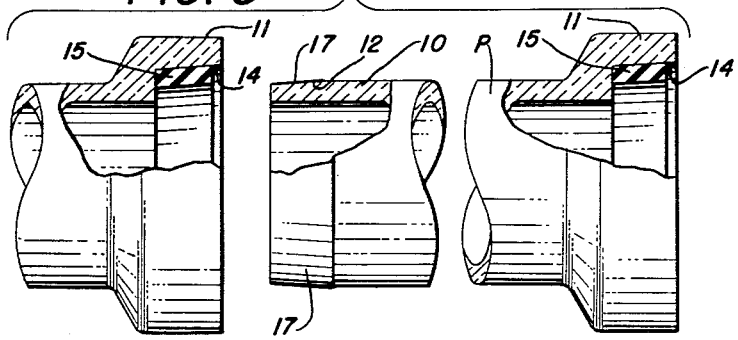
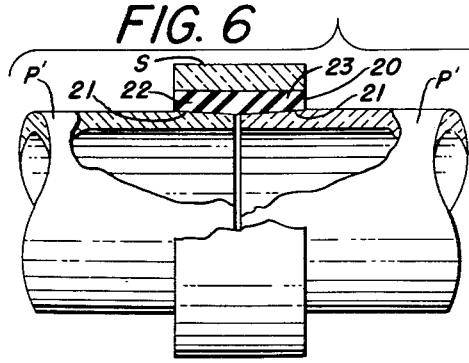
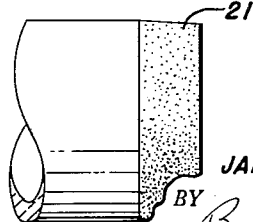
INVENTOR.
JAMES C. JOHNSTON
BY Bosworth & Sessions
ATTORNEYS

United States Patent Office 2,721,159
Patented Oct. 18, 1955

2,721,159

METHOD OF MAKING A MOLDED PIPE JOINT

James C. Johnston, Fort Lauderdale, Fla.

Application December 4, 1952, Serial No. 324,024

6 Claims. (Cl. 154—116)

This invention relates to improvements in pipe joints and methods of making the same, and in particular to joints for connecting sections of vitrified clay sewer pipe and the like.

Conventional vitrified clay sewer pipe sections are each provided with a bell or socket at one end for receiving the spigot or straight end portion of an adjacent section. When sections are assembled to form a pipe line, there is considerable clearance between the exteriors of the spigots and the interiors of the bells within which they are received; the clearance spaces must be blocked or sealed in order to provide leakproof joints. Patent No. 1,979,470 issued November 6, 1934, discloses a successful type of joint in which a tapered collar of asphaltic material is molded about the spigot end of one pipe section and a tapered lining of similar material is molded within the bell end of the adjacent pipe section. The collar and lining are dimensioned to fit each other so that a tight joint is obtained when the spigot end of one pipe section is pushed into the bell end of the other. Before the sections are assembled, an evaporable solvent for the material of the collar and band is applied to the surfaces of one or both members to soften them and render them plastic. Then the sections are assembled with the softened surfaces of the collar and band in firm contact with each other; upon evaporation of the solvent and solidification of the softened materials, the collar and band are united into a substantially homogeneous joint which is bonded to both of the adjacent pipe sections. While joints of this character have been used widely, difficulties have been encountered because the collars on the spigot ends of the pipe sections are subject to damage in shipping and handling and the collars are sometimes inadequately bonded to the spigot ends. Also, the joints of the pipe sections require precast rings of sealing material on both ends of each section of pipe.

A general object of the present invention is the provision of pipe joints, adapted for bell and spigot and also for straight pipes, and of methods of making the same wherein the above noted difficulties are eliminated. Another object is the provision of a pipe joint in which cast rings or collars of sealing material are required only within the bells or sockets that receive the spigot ends of the sections, and in which no cast rings or collars of sealing material are required on the spigot ends. Another object of the invention is the provision of a joint for pipe sections in which a ring of sealing material adapted to substantially fill the clearance space between the interior of the bell or socket and the spigot of the section to be joined thereto is cast within the bell or socket and wherein the spigot ends of the pipe sections are securely bonded to the interior surfaces of such rings when the sections are assembled to form a pipe line. Another object is the provision of such a pipe joint or union wherein the socket portions are separately formed and are adapted to join two pipe sections together without requiring either pipe section to be provided with a bell. Another object is the provision of an economical and efficient method of making such pipe joints.

Briefly, according to one form of the present invention, joints between adjacent sections of pipe are made by casting an accurately dimensioned ring of asphaltic or other suitable sealing material within the socket, or female part of the joint, the ring being outwardly tapered and dimensioned to receive the spigot or cylindrical end of a pipe section to be joined thereto. The socket may be the bell end of a bell and spigot pipe section, or may be a separate short socket member in which case it will have two oppositely tapered rings and will constitute a union between two straight pipe sections. In order to eliminate the dimensional and surface irregularities ordinarily found in the ends of vitrified sewer pipe sections and to provide an accurate, round, tapered surface on the pipe to which the cast ring is to be firmly bonded, the end of the adjacent pipe section is externally ground by means of abrasive wheels or the like. The ground surface is tapered to correspond to the taper of the internal surface of the ring within the socket and is dimensioned to wedge tightly therein. The ground end of the pipe section is then provided with a thin, adherent coating composed of a sealing material identical with or similar to the material of the ring, the ring or the coating or both are softened by means of a solvent and then the end of the pipe section is pressed home within the socket. Upon dissipation of the solvent a joint is produced that consists essentially of a one-piece substantially homogeneous ring of sealing material bonded firmly to the socket or the bell of one pipe section and the tapered end of the other thus providing a permanent leakproof connection.

Preferred forms of pipe joints embodying the invention and a preferred method of making the same are illustrated in the accompanying drawings in which Figure 1 is a view partially in section showing a joint for bell and spigot pipe made according to the present invention;

Figure 2 is a view illustrating a conventional section of pipe prior to the production of my joint;

Figure 3 shows a pipe section after the ring has been cast within the bell and after the spigot has been ground to tapered form;

Figure 4 illustrates, on an enlarged scale, a portion of the ground spigot end of the pipe section with the coating applied thereto;

Figure 5 illustrates two pipe sections just before they are assembled to provide a joint such as shown in Figure 1;

Figure 6 is a view, partially in section, showing another form of the invention in which a separate socket or union is used to join two straight pipe sections; and Figure 7 is a view, partially in section, showing the union utilized in making the joint of Figure 6.

Referring now to Figure 1 of the drawings, a joint made according to my invention is particularly adapted to make a connection between the spigot end 10 and the bell end 11 of pipe sections P. In the completed joint as shown in Figure 1, the clearance space between the exterior tapered surface 12 of the spigot end 10 and the interior surface 14 of the bell end 11 is filled with a sealing ring 15 which is bonded firmly to the interior surface 14 and the tapered exterior surface 12. The sealing ring preferably is composed of an asphaltic material which is insoluble in water and in the waste materials ordinarily conducted in sewer lines; the material is adhesive so that it will bond to the adjacent pipe sections, is tough to resist root penetration and retains some elasticity or flexibility to allow for displacement of the pipe line because of settling and the like, without breaking the pipe sections or the joint material. A sealing material having the above advantages may be compounded from petroleum asphalt and an inert filler such as finely ground silica, the physical characteristics of one suitable material being as follows:

| | |
|---|---|
| Total bitumen (approx.) _____ per cent__ | 40 |
| Total inorganic filler (approx.) _____ do ____ | 60 |
| Specific gravity at 77° F _____ | 1.549 |
| Melting point—ball and ring _____ °F__ | 244 |
| Penetration at 77° F. by weighted needle (100 gm.-5 sec.) _____ | 5.5 |
| Elongation, ductility at 77° F _____ cm__ | 7 |

The above characteristics can be varied within reasonable limits. However, it is desirable to employ a sealing material that will not fracture readily under cold conditions and yet will not flow under hot weather conditions. A satisfactory material having substantially the above characteristics can be produced by utilizing 40% of an air blown petroleum asphalt having a melting point of about 225° F. (the asphalt sold by the Standard Oil Company of Indiana under the name of "Korite" No. 3 is suitable) and 60% of finely ground silica.

The steps in the manufacture of the joint shown in Figure 1 are illustrated in Figures 2–5 respectively. Figure 2 shows simply a conventional sewer pipe section P having a straight spigot end 10 and flared bell or socket end 11. Pipe sections of this type have a hard, vitreous finish on all exposed surfaces and because of distortions of the clay during handling, firing and cooling of the sections, the sections are not truly round and frequently have surface irregularities which make the production of leakproof joints difficult.

These difficulties are overcome according to the present invention by casting the sealing ring 15 within the bell 11, the ring preferably being composed of a material such as described above and being cast with the aid of an accurately formed die or mold so that the interior surface of the ring is round and of the desired dimensions regardless of irregularities in the interior surface of the bell. The ring is accurately tapered to the desired degree, which may be approximately 3° as shown. The operation of casting the ring within the bell end of the pipe may be carried out by means of a die or mold such as shown in my Patent No. 2,284,741 issued June 2, 1942, the mold however being smaller in proportion to the diameter of the pipe than the mold shown in my said patent so that the ring of sealing material cast with the aid of the mold will, in accordance with the present invention, substantially fill the clearance space between the bell of the pipe and the spigot end of an adjacent section of pipe.

In order to make possible the bonding of the spigot end of each section of pipe to the bell end of an adjacent section and to insure an accurate fit in spite of irregularities and inaccuracies in the spigots, each spigot end 12 is ground as shown in Figure 3 to a taper corresponding to the taper of the cast ring 15 within the bell end of the pipe; the end 12 is also ground so that the external surface is round and dimensioned properly to fit the ring. The grinding operation is preferably carried out with abrasive wheels or the like. This operation not only provides surface to fit accurately within the accurately cast ring 15 but also removes the impervious glaze from the exterior of the spigot and provides a comparatively porous surface as indicated diagrammatically in Figure 3 which is well adapted to bond with the sealing material. The completion of the grinding operation produces a pipe section as shown in Figure 3. The operations of casting the ring 15 and grinding the surface 12 are preferably carried out at a mill or factory; after these operations have been completed the pipe sections may be shipped to the job, but the ground surfaces 12 are preferably provided with a thin coating of sealing material at the mill or factory as will appear below.

In order to insure proper bonding of the spigot end with the cast ring of sealing material 15, the ground, tapered surface 12 of the spigot end of the pipe section is provided with a coating 17 of a sealing material which is identical with, similar to, or compatible with the sealing material making up the ring 15. This coating may be applied by dipping ground surface 12 into a bath of molten sealing material or by brushing or otherwise applying a thin layer of the sealing material dissolved in a suitable solvent. In either case, the coating is permitted to solidify before the joint is completed to insure proper bonding to the surface 12. If the coating is produced by dipping in molten material, the operation may be carried out conveniently at the same time the ring 15 is cast, using the same material. If the material is dissolved in a solvent, a cut-back asphalt may be employed and applied either at the time of casting the ring or on the job. The coating 17, regardless of how it is produced, is relatively thin and of substantially uniform thickness. As shown diagrammatically in Figure 4 the coating material penetrates the porous surface of the ground surface 12 becoming bonded firmly thereto. Since the coating is of uniform thickness, its exterior surface is circular and has the correct taper to fit within the tapered inner surface of the ring 15. Because of the thinness of the coating and its penetration of the surface 12, the coating is not likely to be damaged in shipment and cannot readily be chipped up off the underlying porous surface 12 to which it is firmly bonded.

The final assembly operation is shown in Figure 5. Here the pipe sections P are aligned and ready to be pushed together. The ring 15 within the bell 11 has preferably been softened by the application of a volatile solvent for the sealing material, a cut-back asphalt being very satisfactory for this purpose. The spigot end has its ground surface 12 provided with a coating 17 and this coating also is preferably, but not necessarily, softened. The coating 17 may be softened by applying the same solvent material, such as a cut-back asphalt, thereto. The assembly is completed simply by inserting the frusto-conical surface 12 of the spigot end of the pipe having the coating 17 thereon within the frusto-conical ring 15, with one or both of the mating surfaces in a softened condition due to the presence of solvent, and shoving the spigot end home. The presence of the softened material acts as a lubricant in the assembly of the joints so excessive forces are not required. While it is preferred that a coating of solvent such as cut-back asphalt be applied to the interior surface of the ring 15, this is not essential if an adequate amount of solvent is applied to the coating 17 immediately before the joints are assembled. Similarly it is not essential to apply solvent to the coating 17 if an adequate amount of solvent is applied to the inner surface of ring 15.

After assembly, the volatile solvent slowly evaporates and diffuses with resultant solidification of the material and the production of a substantially homogeneous seal extending solidly between the interior of the bell and the exterior of the spigot and firmly bonded to both. In practice, the joint is completed and reaches adequate strength within a few days, the time for the dissipation of the solvent depending on the temperature and other conditions encountered on the job.

Figures 6 and 7 of the drawings illustrate a modified form of joint in which two straight pipe sections P' are joined together by means of a union consisting of a separately formed socket or sleeve member S. In this form of the invention, the socket or sleeve member S consists merely of a short piece of pipe while the pipe sections P' are straight pieces of pipe having no bell ends; i. e., each section of pipe may be considered as having two spigot ends. The internal diameter of the sleeve S is sufficiently greater than the external diameter of pipe sections of the same external diameter as the sections P' to provide a clearance space between the inner surface 20 of the sleeve S and the tapered, external surfaces 21 of the pipe sections P'; the clearance space is filled with rings 22 and 23 composed of a sealing material such as previously described, the rings being produced and bonded to the sleeve and the external surfaces 21 of both pipe sections P' in the manner previously described, thus making a leakproof joint or connection between the sections.

The rings 22 and 23 are oppositely tapered as shown to provide two frusto-conical inner surfaces 24 and 25 to receive the correspondingly tapered frusto-conical outer surfaces 21 of two pipe sections P'. The rings may be cast within the sleeve S in a manner similar to that described in conjunction with the production of the ring 15 by disposing the ring in a vertical position on a flat surface and positioning within it a two-part mold made up of two frusto-conical sections which are separable approximately on the median line of the sleeve as indicated at 26 in Figure 7. The sealing compound is poured in hot to fill the space between the mold and the inner surface of the sleeve, the mold sections being removed after the sealing compound is solidified. When so produced, the rings 22 and 23 are integrally joined and are formed by a single pouring operation.

The end surfaces 21 of the pipe sections P' are produced preferably by grinding both ends of each section in the same manner as the end surfaces 12 of the pipe sections P previously described. The end joints are completed by essentially the same procedure as that previously described; that is, the ground surfaces 21 of the pipe sections P' are provided with coatings of sealing material by one of the operations previously described, which coatings penetrate and become bonded to the surfaces 21 and are permitted to solidify before the joints are completed; solvent is supplied to the mating surfaces by one of the methods previously described, the sleeve S is pushed over the end of one pipe section P' and then the other pipe section P' is pushed home into the other end of the sleeve S. It will be noted that the dimensions of the ring 22 and the tapered surfaces 21 are such as to provide a slight amount of clearance between the ends of the pipe sections so that the ends of the sections cannot abut and prevent the sections from being pushed home properly in the sleeve. The joint is completed by dissipation of the solvent and solidification of the sealing material as before. This type of joint has essentially the same characteristics as the joint previously described but is advantageous in that it is adapted to join straight sections of pipe which can be produced at lower cost than bell and spigot pipe sections. In addition, this type of joint also provides a slightly more flexible connection because both pipe sections can move with respect to the sleeve to permit deflection of the pipe line due to settling and like causes.

From the foregoing description of preferred forms of my invention, it will be seen that I have provided simple and effective pipe joints particularly adapted to the joining of sections of vitrified sewer pipe. The sealing rings of my joints are firmly bonded to both the socket and spigot parts of joined pipes resulting in permanent leakproof joints. The joints are resistant to acids and alkalis, do not flow or crack under the ordinary range of temperatures likely to be encountered in service and permit gradual settling and movement of the pipe sections with respect to each other. The pipe sections are automatically centered with respect to each other when the joints are assembled. The joints can be produced economically inasmuch as it is necessary to cast rings only within the socket portions. The pipe sections can be shipped without damage because there is only a thin coating of asphalt on the spigot ends which is firmly bonded to the underlying porous structure of the pipe. No moulds are necessary in applying the thin coatings to the spigot ends of the pipe because the coatings are so thin that they conform to the shape of the spigot ends which are ground accurately to the desired taper and roundness. The assembly of the joints can be completed by unskilled labor under adverse conditions with the production of tight joints.

Those skilled in the art will appreciate that various changes and modifications can be made in my invention without departing from the spirit and scope thereof. The essential characteristics of the invention are set forth in the appended claims.

I claim:

1. The method of joining a section of glazed vitrified clay pipe having a spigot end to a socket which comprises molding a ring of sealing material with a tapered inner surface within the socket, grinding the exterior of the spigot end of the pipe section to remove the glaze therefrom and provide a porous, tapered outer surface adapted to fit the inner surface of said ring, coating said porous surface with a thin substantially uniform layer of sealing material in a fluid state, permitting said layer to penetrate said porous surface and solidify, applying a volatile solvent for said sealing material to soften the inner surface of said ring and said coating, and fitting said surfaces together, thereby to bond said outer surface of said spigot to the inner surface of said ring upon evaporation of said solvent.

2. The method according to claim 1 wherein the sealing material is asphaltic and wherein the coating is applied to said porous surface by dipping said surface in a bath of molten sealing material.

3. The method according to claim 1 wherein the sealing material is asphaltic and wherein the coating is applied to said porous surface in the form of a solution of sealing material in an evaporable solvent.

4. The method according to claim 1 wherein the socket constitutes the bell end of a section of bell and spigot pipe.

5. The method according to claim 1 wherein the socket is a separately formed sleeve member.

6. The method of joining a section of vitrified clay pipe having a spigot end with an impervious glaze on the exterior thereof to a socket having an internal diameter greater than the external diameter of said spigot end and which comprises molding a ring of sealing material with a tapered inner surface within said socket, grinding the exterior of the spigot end of the pipe section to remove the glaze therefrom and to provide thereon a porous, tapered outer surface adapted to fit the inner surface of said ring, providing said porous surface with a penetrating adherent solidified thin coating of sealing material of substantially uniform thickness throughout, and bonding said coating on said surface to the inner surface of said ring.

References Cited in the file of this patent

UNITED STATES PATENTS

| Number | Name | Date |
|---|---|---|
| 1,893,599 | Seymour | Jan. 10, 1933 |
| 1,979,470 | Johnston | Nov. 6, 1934 |
| 2,379,990 | Rembert | July 10, 1945 |
| 2,388,846 | Hecht | Nov. 13, 1945 |
| 2,401,554 | Davids | June 4, 1946 |
| 2,589,876 | Sesher | Mar. 18, 1952 |
| 2,622,901 | Seymour | Dec. 23, 1952 |

FOREIGN PATENTS

| Number | Country | Date |
|---|---|---|
| 26,644 | Great Britain | Dec. 16, 1898 |